June 19, 1934.    J. A. NORTON    1,963,863
WIND MOTOR
Filed Sept. 23, 1932    2 Sheets-Sheet 1

Inventor
Jesse A. Norton

Geo. S. Kimmel
Attorney

June 19, 1934.                J. A. NORTON                1,963,863
                                WIND MOTOR
                       Filed Sept. 23, 1932      2 Sheets-Sheet 2
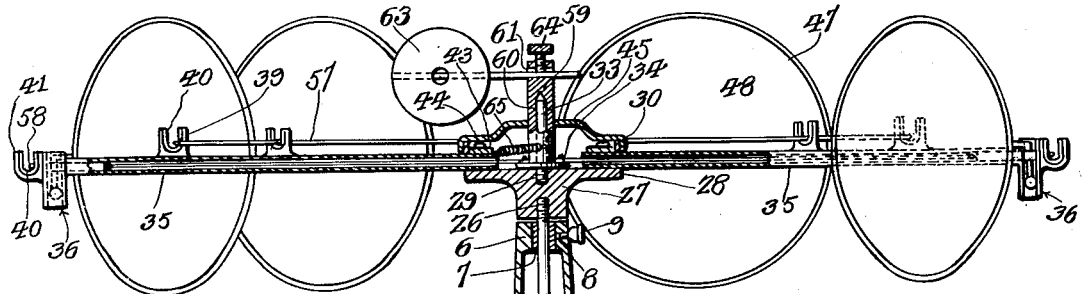
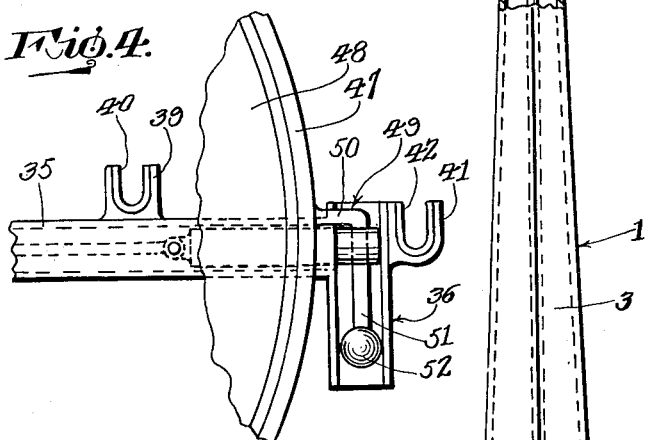
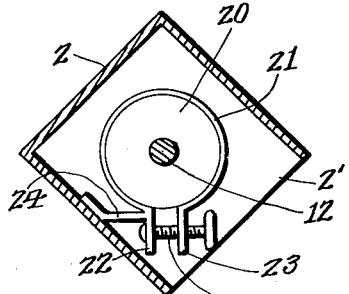
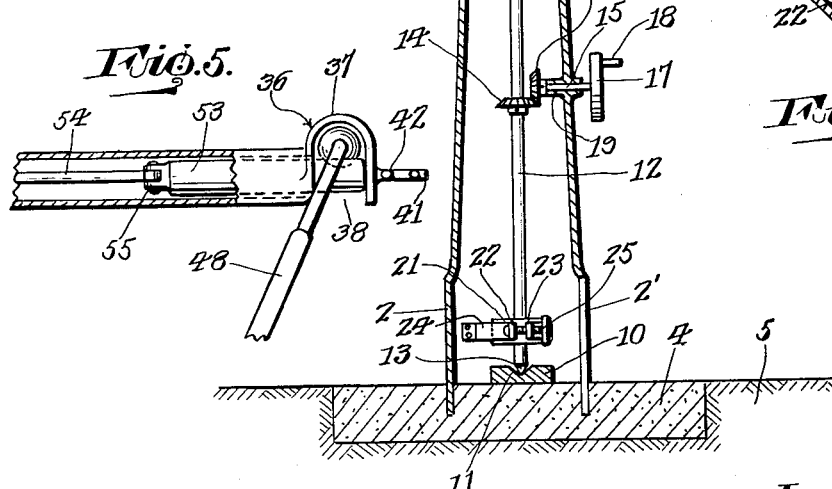
Inventor
Jesse A. Norton
By Geo. P. Kimmel
           Attorney Patented June 19, 1934

1,963,863

UNITED STATES PATENT OFFICE 1,963,863

WIND MOTOR

Jesse A. Norton, Miami, Fla.

Application September 23, 1932, Serial No. 634,581

9 Claims. (Cl. 170—21)

This invention relates to a wind motor designed primarily for operating pumps for elevating water from a low to a high level for the purpose of supplying water to the plumbing system of a house, but it is to be understood that a wind motor in accordance with this invention may be employed for driving or operating any device or machine for which it may be found applicable, and the invention has for its object to provide, in a manner as hereinafter set forth, a power generating apparatus in the form of a wind motor having means for transmitting the power generated to the object, such as a pump, machine or device which is desired to be operated.

A further object of the invention is to so construct a wind motor primarily designed for domestic purposes and of a form, which can be installed in the well kept home districts of cities and suburbs, without objections from home owners or the laws which have been enacted against the erection of wind mills in city limits.

A further object of the invention is to provide, in a manner as hereinafter set forth, a wind motor including wind driven impellers, and means automatically operating on a destructive wind for releasing the impellers to permit of the same falling to the ground under such conditions preventing the destruction of the impellers, as well as other structural features of the motor.

A further object of the invention is to provide, in a manner as hereinafter set forth, a wind motor so constructed as to permit of the impellers, after being released as referred to in the preceding paragraph to be conveniently assembled in their working position when desired.

A further object of the invention is to provide, in a manner as hereinafter set forth, a wind motor including a series of impellers, a power transmitting shaft operated from the impellers and means for automatically discontinuing the action of the impellers on the power transmitting shaft in case of a destructive wind.

A further object of the invention is to provide, in a manner as hereinafter set forth, a wind motor so constructed and arranged that it will be perfectly quiet in its operation and not open to the objection of disturbing noise.

A further object of the invention is to provide, in a manner as hereinafter set forth, a wind motor so constructed and arranged to enable all the working parts thereof to be reached by an attendant standing upon a comparatively low support, such as a three foot step ladder.

Further objects of the invention are to provide, in a manner as hereinafter set forth, a wind motor which is simple in its construction and arrangement, strong, durable, compact, conveniently and inexpensively repaired when occasion requires, thoroughly efficient in its use, readily assembled, including wind driven impellers capable of being quickly removed when desired, and inexpensive to set up.

To the above ends essentially and to others which may hereinafter appear, the invention consists of such parts and such combination of parts which fall within the scope of the invention as claimed.

In the drawings:

Figure 3 is a section on line 3—3 Figure 1.

Figure 4 is a fragmentary view in elevation of the mounting of an impeller.

Figure 5 is a fragmentary view in sectional plan of the mounting of an impeller.

Figure 6 is a sectional detail illustrating the braking device.

Figure 1:
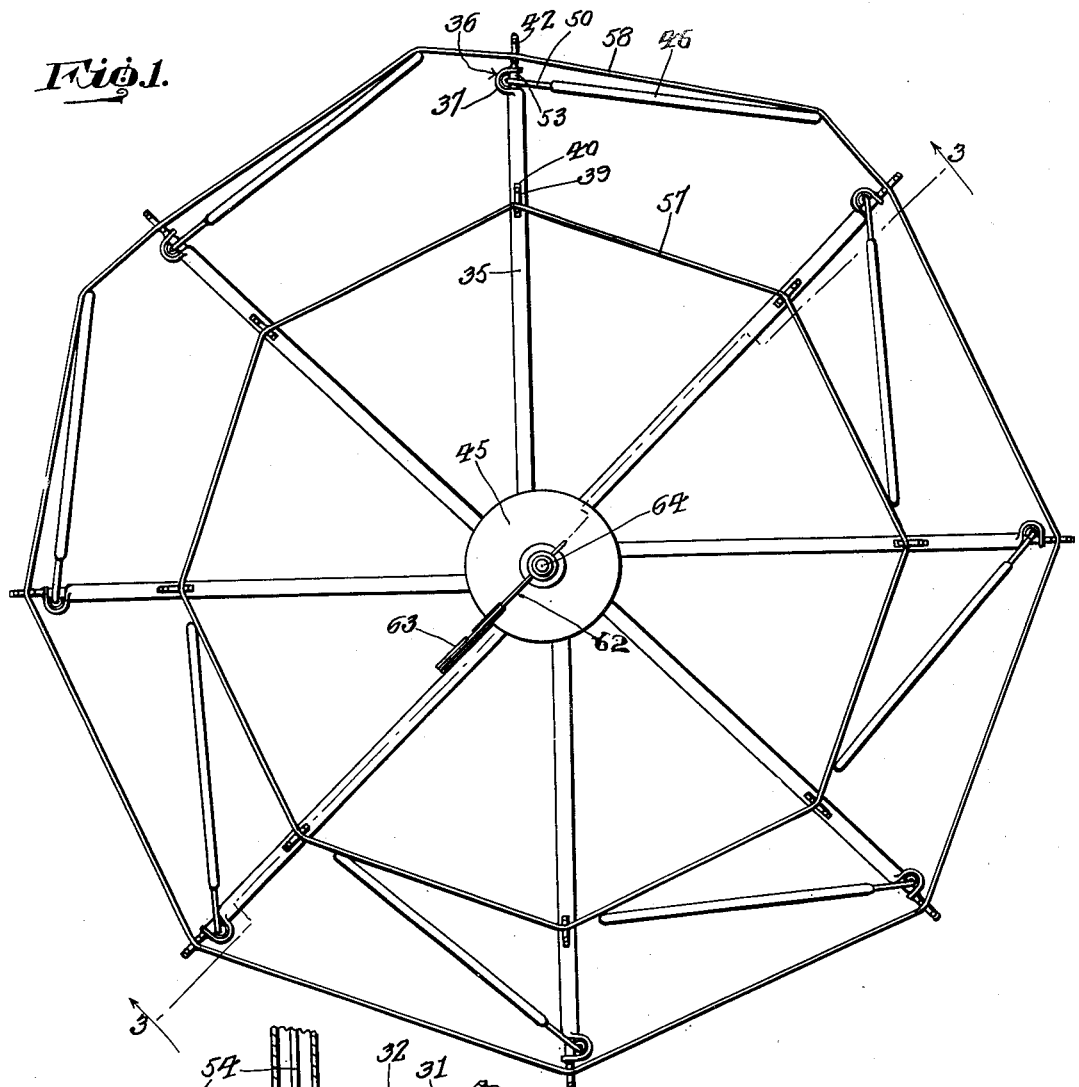
Figure 1 is a top plan view of the wind motor.

The motor includes a hollow standard or post 1 formed of a polygonal shaped part 2 of uniform dimensions and a tapered polygonal shaped part 3 of greater length than part 2. The latter is the base portion of the standard and is anchored in a foundation 4 of concrete embedded in the ground 5. The part 2 is open at one side, as at 2', so access can be had thereto. The standard may be of any height desired, but preferably whereby the elements of the motor, arranged at the top thereof may be reached by one standing upon a comparatively low support, such as a three foot step ladder. The part 3 at its upper end is formed with an inwardly extending annular flange 6 for encompassing a bearing sleeve 7. The part 3 has a lateral opening 8 extending from its inner to its outer face and through flange 6. A lubricant supply cup 9 is attached to part 3 and discharges into opening 8.

Arranged upon foundation 4 and within part 2 is a bearing block 10 having a tapered recess 11 in its upper face. Arranged within standard 1 as well as extending upwardly through sleeve 7 is a power transmitting shaft 12 having a pointed lower end 13 positioned in recess 11. Secured to shaft 12 is a beveled gear 14 for operating a laterally disposed transmission comprising a shaft 15 provided at its inner end with a bevel gear 16 and at its outer end with a disc 17 carrying an eccentrically disposed pin 18. The part 3 has a lateral opening for the passage of shaft 15. Oppositely extending collars 19 are formed on part 3 forming bearings for shaft 15. The gear 14 meshes with gear 16 for driving the transmission. The pin 18 is adapted to be coupled with the pump or other machine which is to be driven from the motor.

A braking device is provided for shaft 12, which includes a disc 20 fixed to shaft 12 in proximity to its lower end, a split brake band 21 encompassing disc 20 and having angularly disposed parallel spaced end portions 22, 23, the former being fixed to an arm 24 anchored to part 2. Carried by and extending through the end portions 22, 23 is a coupling adjusting means for the band. Said means consists of a rotatably threaded element 25 coupled to end portion 22 and threadedly engaging with end portion 23.

The upper end of shaft 12 extends a substantial distance above part 3 of standard 1 and such portion of shaft 12 is threaded, as at 26 for threadedly engaging in the bottom of a laterally flanged hub 27. The flange of the latter is indicated at 28, is arranged at the upper end of the hub and is of annular contour. A socket 29 having a threaded wall is formed in the upper end of hub 27. An upstanding annular collar 30 is integral with and flush with the outer edge of flange 28 and is formed with a series of spaced openings 31. The flange 28 has its upper face provided with spaced grooves 32 having the walls thereof registering with the walls of the openings 31. The grooves are tangentially disposed with respect to the axis of the hub 27.

Fixed in the socket 29 is the lower end of a vertical shaft 33 which extends through an annulus 34 seated upon hub 27.

Mounted in each groove 32 and extending outwardly through an opening 31 is a tubular member or spoke 35 provided at its outer end with a vertically disposed retainer or abutment 36 which is of U-shaped contour in plan. The retainer 36 has its leading side 37 closed throughout and its follower side 38 open throughout. The leading side 37 of retainer 36 is offset with respect to the leading side of a member 35. The purpose of retainer 36 will be presently referred to. Formed integral with the top of member 35 in proximity to its outer end is a vertically disposed yoke 39 having a lining 40 of vitreous material. Formed integral with the upper part of the front of retainer 36 is a vertically disposed yoke 41 having a lining 42 of vitreous material. The retainer 36 depends below member 35.

The tubular members 35 are anchored to the flange 28 by a clamping ring 43, which is retained in overlapping position with respect to the members 35, by holdfast means 44 engaging in flange 28. A closure cap 45 is seated on collar 30.

The motor includes a series of upstanding, thin, flat, light, fragile impellers or vanes 46 of circular form which correspond in number to that of members 35. Each impeller 46 comprises a rim 47 of wire and a body part 48 of water proofed fabric anchored to rim 47. Integral with the outer edge of the latter is an arm 49 formed of a horizontal part 50 and a vertical part 51 depending from the outer end of and of greater length than part 50. The lower end of part 51 carries a globular weight 52. The part 50 is integral with ring 47, extends into and is supported in a retainer 36. The part 51 depends in retainer 36.

Each of the impellers 46 is detachably connected to and shiftable relative to a member 35 by a suspension element 53 which is slidably mounted in the outer portion of the latter, normally projects outwardly therefrom and abuts the inner face of the front of a retainer 36. The outer end of the element 53 normally supports part 50 of a rear 47. The part 51 of the latter is normally arranged between the outer end of element 53 and the inner face of the leading sides of a retainer 36. The weight 52 on the lower end of part 51 of arm 49 normally abuts the inner face of the leading side of retainer 36 and coacts with the latter for maintaining the impeller 46 in an upright position. The arm 49 is shiftably mounted upon the outer end of the element 53 when an impeller is connected to a member 35. The element 53 in connection with retainer 36 detachably connects the arm 49 to member 35.

The arm 49 and weight 52 provide the impeller with a weighting means extended from one side thereof, whereby when the impeller is released and falls from a member 35, the weighting means will first strike the ground and prevent injury to the rim 47 and fabric body part 48.

Slidably mounted in the member 35 are shifting rods 54 for the elements 53. Each rod 54 is pivotally connected at its outer end, as at 55 to the inner end of an element 53. The inner end of each rod 54 is pivotally connected, as at 56 to the annulus 34.

Mounted in the yoke 39 is an endless cable 57. Mounted in the yoke 41 is an endless cable 58. The impellers 46 are arranged between the cables 57, 58 and the purpose of the latter is to bring the impellers to a gentle stop. Each cable is made of cotton sash cord heavily treated with paraffin, which makes it water proof and also acts as a lubricant for the cable. The cables extending through the vitreous linings of the yokes are adapted to be loosely impacted by the impellers, when the latter are active, causing the cables to travel slowly through such linings thereby giving the cables even wear and long life.

A spring controlled extendible and contractible means is common to the rods 54 for simultaneously shifting them in a direction to provide for the release of the impellers from the members 35. The said means can be manually operated or operated by a destructive wind to automatically release the impellers. The said means comprising a vertically disposed bar 59 having a socket 60 for the reception of shaft 33. The bar 59 is revolubly mounted about shaft 33, extends through cover 43 and secured to annulus 34. The bar 59 in proximity to its upper end has a diametrically disposed opening 61 in which is adjustably arranged a laterally disposed rod 62 having its outer portion secured diametrically of one face of a vertically disposed apertured disc 63. Carried by bar 59 is a set screw 64 for retaining rod 62 in its adjusted position. A controlling spring for bar 59 is indicated at 65, which is anchored to hub 27 and to bar 59.

The hub 27, members 35 and cables 57, 58 provide a wheel and the impellers in connection with the wheel constitute a rotor.

The light impeller is not sluggish to the wind, will not strike the cables with force and wear them out as an iron disc or sails would do, and cannot become noisy, due to its lightness, is easily and cheaply made for large wind capacity, and being round is stronger of construction, also neater of design and has the advantage of leaving more wind blow through the wheel which is necessary in this type of wind motor, as much of its power is received by the wind blowing through the wheel and striking the impeller on the opposite side of the wheel; the cables bring the impeller to a gentle stop without the use of springs of any kind; the large fabric impellers are not subject to much abuse by the average wind as the centrifugal force of the revolving wheel holds them outward in a continuous circle and stationary, which the wind has no effect upon until the speed of the wheel drops below that of the wind then the impellers go into action again setting the wheel on another spin.

In operation and with reference to Figure 1, the position of the impellers 46 with respect to the wheel is such that when the impellers are acted upon by the wind, from a southern to a northern direction or from bottom to top of the drawings, the wheel will be driven in an anti-clockwise direction. For clockwise rotation of the wheel the impellers will be arranged on the opposite sides of the spokes 35 than as shown.

A balanced or inoperative position of the impellers is overcome, because the impellers are circular, thin and flat which materially reduces detrimental vacuum and resistance to the lowest possible degree. The impellers are very light and formed with angle-shaped arms extended beyond their rims whereby the impellers are very sensitive and assume their proper positions in the slightest breeze. The cables 57 and 58 restrict unnecessary travel of the impellers and stop the latter at an angle to the wind.

The wind first contacts the impellers on their outer surface, then passing through the wheel acts upon the inner surfaces of the impellers with slanting blows, transferring pressure to the spokes 35 causing the motor to rotate. The arrangement shown provides for approximately 75° of the impellers delivering power to the wheel. Two of the impellers are in direct line with the wind momentarily delivering no power, yet offering practically no detrimental resistance to the wind.

Figure 2:
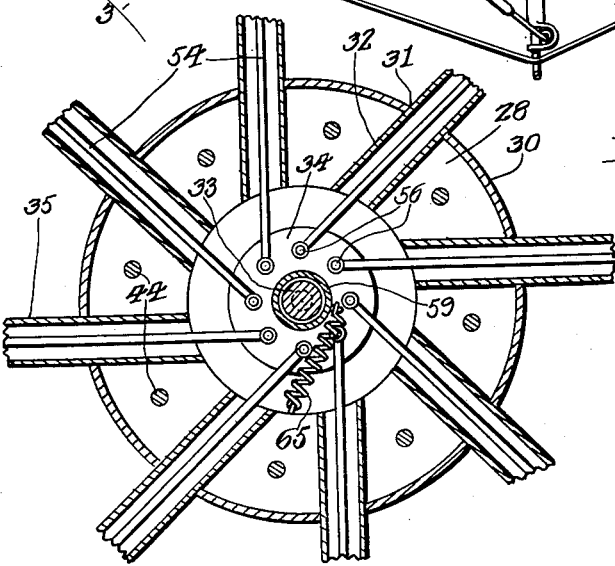
Figure 2 is a fragmentary view in sectional plan.

When operating, should the wind become destructive, the vane 63 when carried to the wind would meet such resistance that a cam movement would be exerted on element 34, Figure 2, resulting in the rods 54 and elements 53 moving inwardly and releasing arms 49 which would release all of the impellers 46 simultaneously and permitting them to fall to the ground.

The weights 52 on arms 49 form locks to prevent the impellers 46 from jumping up beyond elements 53 and further act as guides and side bearings.

The motor derives much of its power from the wind as it passes through the wheel striking the impellers on their inner side and skidding off, much as a sail boat is driven nearly against the wind. All material used in the construction of any wind wheel to hold impellers offers resistance to the wind which greatly lessens the power of the motor. Due to the light impellers I have been able to reduce the construction of this wheel to a light, strong and simple form, which reduces detrimental resistance to the lowest possible degree.

What I claim is:—

1. A wind driven motor including a driven wheel forming structure provided thereon with spaced endless parallel flexible stops, spaced wind driven impellers arranged between said stops for driving said structure, said impellers having arms extended from the outer sides thereof, and a spring controlled wind driven releasable device carried by said structure for shiftably supporting said arms at the outer edge of said structure, said device and structure having coacting means coacting with said arms for releasably coupling the impellers to said structure in wind driven position therefor.

2. In a wind motor, circular impellers, each comprising a thin circular metallic rim, a fabric positioned within, of a contour corresponding to and secured throughout its edge to and throughout the inner face of the rim and an angle-shaped coupling arm secured at one end to the outer face of the rim and having its other end formed with a weighting means.

3. In a wind driven motor of that type including a horizontally disposed revoluble structure provided with spokes and wind driven impellers shiftably connected to the spokes, the combination of a set of outer yokes, each positioned at the outer end of a spoke, a set of inner yokes, each positioned on the top of a spoke intermediate the ends of the latter, an inner endless stop slidably mounted in said inner set and common to said impellers for arresting the inward shift of the latter, and an outer endless stop slidably mounted in said outer set and common to said impellers for arresting the outward shift of the latter.

4. In a wind motor of that type including a horizontally disposed revoluble structure provided with spokes and wind driven impellers shiftably connected to the spokes, the combination of an endless stop adjacent the outer ends of the spokes and common to the impellers for arresting the outward shift of the latter, means connected to the outer ends of the spokes for slidably supporting said stop, an inner endless stop positioned above said spokes intermediate the ends of the latter, spaced from the said other stop and common to the impellers for arresting their inward shift, and means connected to the tops of the spokes for slidably supporting said inner stop.

5. In a wind driven motor of that type including a horizontally disposed revoluble structure including a set of tubular spokes and wind driven impellers for revolving said structure, the combination of a set of vertically disposed hollow abutments, each having its inner side secured to the outer end of a spoke, a set of spring controlled wind releasable impeller suspension elements, each slidably mounted in a spoke, said elements having their outer ends normally projecting from the outer ends of the spokes and extending across and abutting the inner face of the outer sides of said abutments, and an angle shaped coupling arm for each impeller, said arms having one end connected to said impellers, extending into said abutments and shiftably mounted intermediate their ends upon said elements adjacent the outer ends of the spokes.

6. In a wind driven motor of that type including a horizontally disposed revoluble structure including a set of tubular spokes and wind driven impellers for revolving said structure, the combination of a set of vertically disposed hollow abutments, each having its inner side secured to the outer end of a spoke, a set of spring controlled wind releasable impeller suspension elements, each slidably mounted in a spoke, said elements having their outer ends normally projecting from the outer ends of the spokes and extending across and abutting the inner face of the outer sides of said abutments, an angle shaped coupling arm for each impeller, said arms having one end connected to said impellers, extending into said abutments and shiftably mounted intermediate their ends upon said elements adjacent the outer ends of the spokes, and a sustaining means for said arms, said means arranged on the other ends of the arms and coacting with said abutments.

7. In a wind motor, a hub, a horizontally disposed bodily revolving set of tubular spokes carried by the hub and adapted to be revolved by wind driven impellers, each of said spokes disposed substantially tangentially to said hub, vertically disposed hollow abutments at and offset with respect to the outer ends of said spokes, a spring controlled releasable set of suspension elements for the wind driven impellers, each of said elements slidably mounted in a spoke, said elements having their outer ends normally projected from the outer ends of the spokes and normally extending across and abutting the interior of said abutments, and counterbalanced angle shaped impeller carrying arms shiftably and releasably mounted intermediate their ends upon the outer ends of said elements.

8. In a wind motor, a hub, a horizontally disposed bodily revolving set of tubular spokes carried by the hub and adapted to be revolved by wind driven impellers, each of said spokes disposed substantially tangentially to said hub, vertically disposed hollow abutments at and offset with respect to the outer ends of said spokes, a spring controlled releasable set of suspension elements for the wind driven impellers, each of said elements slidably mounted in a spoke, said elements having their outer ends normally projected from the outer ends of the spokes and normally extending across and abutting the interior of said abutments, counterbalanced angle shaped impeller carrying arms shiftably and releasably mounted intermediate their ends upon the outer ends of said elements, and a wind impacting actuating and controlling vane common to said elements for shifting them simultaneously to released position in a hard wind to free said arms.

9. A releasable impeller of fragile material being weighted on one side to prevent injury thereto when the impeller drops to the ground.

JESSE A. NORTON.